United States Patent Office 3,793,341
Patented Feb. 19, 1974

3,793,341
INDIGOID DYESTUFFS AND COLORED SYNTHETIC MATERIALS THEREFROM
Guido Genta, Snyder, N.Y., assignor to American Aniline Products, Inc., Lock Haven, Pa.
No Drawing. Continuation-in-part of abandoned application Ser. No. 78,980, Oct. 7, 1970. This application Apr. 19, 1972, Ser. No. 245,566
Int. Cl. C09b 7/00
U.S. Cl. 260—323          7 Claims

ABSTRACT OF THE DISCLOSURE

Synthetic materials are colored with a novel class of compounds which are prepared in substantially quantitative yields by the reaction of an indigoid compound, such as indigotin, with a benzene sulfonyl halide in a thin fluid melt consisting essentially of anhydrous aluminum halide in admixture with a compound that gives a fluid melt at low temperatures. The compounds are dyestuffs for synthetic textile materials such as polyethylene terephthalate, and provide dyeings of improved substantivity, particularly on polyethylene terephthalate. The compounds are also useful as pigments for rigid plastic substrates.

RELATIONSHIP TO PARENT APPLICATION

This application is a continuation-in-part of copending application, Ser. No. 78,980, filed Oct. 7, 1970, and now abandoned.

BACKGROUND OF THE INVENTION

With the increased requirements for new dyes occasioned by the introduction of modern fibers and the increased use of synthetic plastic materials, the search for dyes suitable for such synthetic materials has become increasingly important.

In the area of lower molecular weight compounds, various anthraquinone and azo dyestuffs have found suitability for the coloration of the modern synthetic materials. However, the somewhat higher molecular weight compounds have generally not been found acceptable as dyestuffs for the modern synthetic materials. For example, in the case of aromatic polyesters, notably polyethylene terephthalate, it has been found that such fibers do not readily accept the higher molecular weight compounds as dyes, which often provide dyeings of superior physical properties, especially sublimation properties. As a result, it is difficult to find dyes of acceptable shade and brightness which, when dyed by conventional methods on, for example, polyethylene terephthalate are acceptable in all of the important physical properties of substantivity, lightfastness and resistance to sublimation. The standard of performance required with respect to these physical properties has become increasingly critical because of the demands of the textile industry.

In the early 1950's, aromatic polyester fibers dramatically increased in commercial importance. At that time, several suggestions appeared in the patent literature relating to the use of vat dyes, including thioindigos, as colors for polyester textile material. For example, the basic patent on thermofixation, U.S. 2,663,612, issued to Joseph W. Gibson on Dec. 22, 1953, teaches that polyester fibers can be dyed with thioindigos.

In spite of these efforts to apply vat dyes, particularly indigoid materials to polyesters, vat dyes in general have been subsequently found to have poor substantivity for polyester fibers. For example, indigotin commonly called indigo, if dispersed in the conventional way and applied to aromatic polyester material, imparts virtually no color to the material. Certain specific indigoid compounds are better in performance but, in general, most indigoids are insufficiently substantive to polyester fibers.

With respect to synthetic materials which are plastics, the need for dyes which color such substrates has also increased due to the importance of plastics in contemporary society. Reusser et al., in U.S. Pat. 2,812,329, issued Nov. 5, 1957, discloses a wide variety of high molecular weight compounds, including indigoid compounds, for use with polymers. Although the Reusser et al. compounds are disclosed to be known dyes, there is no disclosure of their use as dyestuffs for the polymers. Rather, the disclosure is directed to the use of such compounds as polymerization inhibitors. Vogel, in U.S. Pat. 3,406,149, issued Oct. 15, 1968, discloses that thioindigoid compounds may be a part of a colored polymeric unit. However, the patentee reports successful results only when the indigoid unit is a part of a high molecular weight chain.

It has now been discovered that a novel class of indigoid compounds are suitable for the dyeing of synthetic materials. Particularly, the compounds are useful for the dyeing of polyester textile materials, such as polyethylene terephthalate, through conventional methods, thereby providing colored fabrics of rich, bright shades of excellent properties. In addition, the compounds are useful for the coloration of rigid plastic substrates.

SUMMARY OF THE INVENTION

According to a first aspect of the invention, there are provided a novel class of high molecular weight dyestuffs. The high molecular weight dyestuffs of the invention (I) comprise indigoid compounds of the following general formula, as well as their mono- and dihalogenated derivatives.

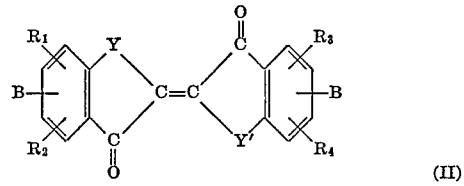

(II)

wherein each of Y and Y' is independently —NH— or —S—; each of $R_1$, $R_2$, $R_3$ and $R_4$ is independently hydrogen, chloro, bromo, lower alkyl, or lower alkoxy; one B is hydrogen and the other B is an arylsulfonyl group of the formula

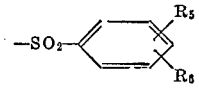

wherein each of $R_5$ and $R_6$ is independently hydrogen, chlorine, bromine, lower alkyl, lower alkoxy or nitro.

In accordance with a second aspect of the invention, there are provided dyed aromatic polyester fabrics which have been produced preferably by thermofixation of a high molecular weight dyestuff (I) onto an aromatic polyester cloth, preferably one of polyethylene terephthalate.

In accordance with a third aspect of the invention, there are provided colored plastic articles, wherein a rigid plastic substrate has been pigmented with a mixture of a high molecular weight dyestuff (I).

DETAILED DESCRIPTION

In the high molecular weight dyestuffs (I), the mono- and dihalogenated derivatives of the indigoid compound (II) contain halogen atoms which are introduced into the indigoid compounds (II) via the reaction of the invention in a thin fluid melt of the anhydrous aluminum halide, above and beyond any halogen atoms which may be present in the indigoid compounds (II) as denoted under the definitions of $R_1$, $R_2$, $R_3$, $R_4$, $R_5$ and $R_6$.

The halogen atoms are preferably chlorine or bromine, and are introduced into the indigoid compounds (II) at an aromatic carbon atom thereof, replacing a free hydrogen atom.

According to a preferred embodiment, there are provided high molecular weight dyestuffs (I) wherein there are mixtures of the indigoid compounds (II) and their mono- and dihalogenated derivatives, such that the average number of additional halogen atoms in the high molecular weight dyestuff (I) is from about 0.1 to about 2.0 per molecule, exclusive of halogen defined by $R_1$, $R_2$, $R_3$, $R_4$, $R_5$ and $R_6$.

The indigoid compounds (II) and their mono- and dihalogenated derivatives are produced through the reaction of an indigoid intermediate (III) with a benzenesulfonyl halide (IV) in a thin, fluid melt of an anhydrous aluminum halide.

The indigoid intermediate (III) is a compound of the formula:

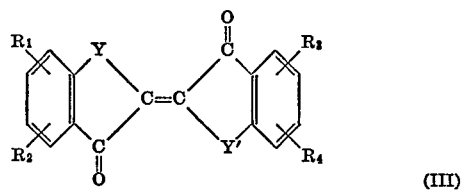

(III)

wherein $R_1$, $R_2$, $R_3$, $R_4$, Y and Y' are as defined above. The benzenesulfonyl halide (IV) is a compound of the formula

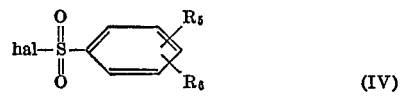

(IV)

wherein hal is chlorine or bromine and $R_5$ and $R_6$ are as defined above. As used herein, the indigoid atoms are numbered according to the following system:

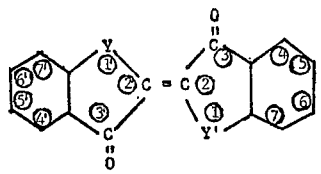

Through the above reaction, in addition to introducing the arylsulfonyl group corresponding to the benzenesulfonyl halide (IV), a certain degree of halogenation accompanies the reaction, thereby producing the mono- and dihalogenated derivatives of the indigoid compounds (II). In order to produce a mixture of compounds having a higher degree of halogenation, additional halogen can be added to the aluminum halide-benzenesulfonyl halide melt. When desired, the preferred mixtures of the indigoid compounds (II) and their mono- and dihalogenated derivates are separated into the constituent individual unhalogenated and mono- and dihalogenated components through known chromatographic methods. The benzenesulfonyl halide (IV) introduces the corresponding arylsulfonyl group into the indigoid intermediate (III) at an aromatic carbon atom having a replaceable hydrogen atom. A mixture of isomers is produced which, when desired, may be separated into the constituent isomers through chromatographic techniques, although this is unnecessary.

As mentioned previously, the preferred halogen atoms which are introduced into the indigoid compounds (II) are chlorine and bromine. In the preferred mixtures of the invention, one or two halogen atoms are introduced per molecule. As lower alkyl groups contained in the high molecular weight dyestuffs (I) may be mentioned preferably those groups containing up to 6 carbon atoms, the methyl, ethyl, propyl, butyl, pentyl and hexyl groups, including the primary, secondary and tertiary isomeric forms. As lower alkoxy groups may be mentioned those groups of up to 6 carbon atoms including the methoxy, ethoxy, propoxy, butoxy, pentyloxy, and hexyloxy groups, the primary, secondary and tertiary isomers being included in the invention.

As the indigoid intermediate (III) may be mentioned:

indigotin,
4,4'-dichloroindigotin,
5,5',7,7'-tetrachloroindigotin,
4,5,4',5'-tetrachloroindigotin,
5,7,6'-trichloroindigotin,
5,5'-dibromo-4,4'-dichloroindigotin,
7,7'-dibromo-5,5'-dichloroindigotin,
5-bromoindigotin,
5-chloroindigotin,
5,5'-dibromoindigotin,
5,5',7,7'-tetrabromoindigotin,
5,5'-dimethylindigotin,
7,7'-dimethylindigotin,
[$\Delta^{2,2'}$-bibenz[f]indoline]-3,3'-dione,
[$\Delta^{2,2'}$-bibenz[e]indoline]-3,3'-dione,
thioindigo,
6,6'-dichlorothioindigo,
7,7'-dichlorothioindigo,
5,5'-dibromothioindigo,
6,6'-dimethoxythioindigo,
5,5'-dichloro-4-methylthioindigo,
6-chloro-6'-methoxy-4-methylthioindigo,
6,6'-dichloro-4,4'-dimethylthioindigo,
5,5'-dichloro-7,7'-dimethylindigo,
[$\Delta^{2,2'}$(1H,1'H)binaphtho-[2,1b]thiophen]-1,1'-dione,
2-(3-oxo-2(3H)thianaphthylidene)pseudoindoxyl,
2-(5-chloro-7-methyl-3-oxo-2(3H)thianaphthylidene) pseudoindoxyl,
5-bromo-2(3-oxo-2(3H)thianaphthylidene) pseudoindoxyl,
7-methyl-2(3-oxo-2(3H)thianaphthylidene) pseudoindoxyl,
3(3-oxo-2(3H)thianaphthylidene)oxindole,
5-bromo-3(3-oxo-2(3H)thianaphthylidene)oxindole, and
5-chloro-3(5-methyl-3-oxo-2(3H)thianaphthylidene) oxindole.

As the benzenesulfonyl halide (IV) may be mentioned benzenesulfonyl chloride or bromide and benzenesulfonyl chloride or bromide substituted with one or two of the same or different groups, including lower alkyl, lower alkoxy, chlorine, bromine or nitro. Representative are p-toluenesulfonyl chloride, p-chlorobenzenesulfonyl chloride, 2,4-xylenesulfonyl chloride and p-bromobenzenesulfonyl bromide.

The novel reaction of the invention takes place in a thin fluid melt consisting essentially of anhydrous aluminum trichloride or aluminum tribromide in admixture with a compound that gives a fluid melt at low temperature. The preparation of such melts, is well established in the dye art and is described, for example, by G. R. Genta in U.S. Pat. 2,650,928, issued Sept. 1, 1953. The fluid character of the melt can be achieved by admixing the anhydrous aluminum trihalide with either an alkali metal halide, sulfur dioxide, urea, or a tertiary base.

If an alkali halide is used to provide the fluid melt, it should be present in an amount of one part by weight alkali metal halide to each 5–10 parts by weight aluminum halide. Useful alkali metal halides include sodium chloride, sodium bromide, potassium chloride, potassium bromide, lithium chloride and the like.

From a practical standpoint, it is preferred to make the melt by admixing aluminum trihalide with a tertiary base which is liquid at a temperature ranging from about 80–130° C. Useful tertiary bases include pyridine, α-picoline, quinoline, dimethylaniline, diethylaniline, triethylamine, dimethylformamide, and dimethylacetamide. The use of 0.05–0.5 part by weight of the tertiary base to one part by weight of the aluminum halide will provide a satisfactory melt.

The melt is made by charging the anhydrous aluminum halide, in a quantity sufficient to enable mixing of the reactants, e.g., 1–5 parts by weight, based on the weight of the reactants, to a suitable reactor. An appropriate quantity of the compound used to thin the melt, for example, the tertiary base, is added to the aluminum halide. The mixture is heated, conveniently to a temperature of 120–130° C., to provide a uniform thin fluid melt.

The melt is cooled and the indigoid intermediate (III) is added thereto. Before or after the addition of the indigoid intermediate (III), the benzenesulfonyl halide (IV) is added slowly, conveniently drop-wise, to control the exothermicity of the reaction, and the temperature of the melt is raised to 75–125° C., preferably to 95–100° C. Sufficient benzenesulfonyl halide (IV) is added to provide at least stoichiometric quantities of the two reactants. An excess of the benzenesulfonyl halide (IV) is helpful in pushing the reaction to completion, and such excess sometimes contributes to raising the halogen content of the final product. The reaction is allowed to continue until completion, which ordinarily requires 1 to 4 hours.

After the reaction is complete, the product is separated from the melt by drowning the reaction mass in ice water and thoroughly agitating the mixture, preferably in the presence of dilute hydrochloric acid. The mixture is boiled, e.g., by heating with live steam, diluted and the product separated by filtration. The filter cake is washed acid free, and excess water is removed conveniently by drying at 60–120° C.

The novel dyes of the invention can be made by a variation of the foregoing procedure in which a halogen, either chlorine or bromine, is introduced to the fluid melt following the addition of the benzenesulfonyl halide (III). Conveniently, this is accomplished by temporarily lowering the temperature of the melt to 60–80° C. and slowly introducing halogen or a halogen supplying compound. Bromination is most conveniently accomplished by adding molecular bromine. Chlorine can be added as chlorine gas or as sulfuryl chloride. The melt is then raised to its original temperature, preferably, 95–100° C., and the reaction is continued for an additional 1–3 hours. The reaction mass is then drowned in ice water and the product is recovered as described above.

In accordance with the second aspect of the invention, there are provided dyeings on synthetic textile materials such as the aromatic polyester fibers. In particular, there may be mentioned polyethylene terephthalate. The dyestuffs, when applied to a synthetic hydrophobic fiber in an amount such that the colored fiber contains about 0.1 to about 2% by weight dyestuff, based on the weight of the fiber, provide colored fibers having rich, bright shades of excellent properties.

In order to dye the synthetic fiber, the dye may be standardized either in the form of a disperse paste or a disperse powder by any of the basic standardizing techniques that have been known to the art for many years; i. e., by the use of appropriate amounts of common dispersants and standardizing agents, usually together with small amounts of anionic wetting agent to assist in dispersion.

Standardized pastes are made by wet milling the dye in conventional equipment in the presence of a dispersing agent, preferably sodium lignin sulfonate or sodium alkylnaphthalene sulfonate. Various other commercially available dispersing agents, such as sodium salts of carboxylated polyelectrolytes and the naphthalene sulfonates; e.g., the condensation products of sulfonated naphthalene and formaldehyde, such as sodium dinaphthylmethane disulfonate, are conveniently used. The dispersed paste may be cut or standardized to a standard strength with water. As noted above, any conventional wetting agent, e.g., sodium cetyl sulfonate, may be added to wet out the product. The final color content of the finished paste averages from 10–40 percent by weight (pure color) active dye base.

Standardized dispersed powders are prepared by wet milling color in the presence of a dispersant, such as those mentioned hereabove, in equipment, such as a ball mill, Werner-Pfleiderer mill or attritor. The dispersed material is oven or spray dried and micropulverized if necessary to provide the dispersed powder. The color is cut or standardized to a standard strength in a blender with a diluent, such as sodium sulfate or dextrin. A wetting agent, such as sodium cetyl sulfate or an alkylphenoxy polyethanol may be added to wet out the product. Dispersed powders are usually cut or standardized to 25–60 percent by weight color content (pure color).

The dye, when added to water with or without auxiliary agents, forms a near colloidal aqueous dispersion from which the aromatic polyester fiber or textile material is dyed in the conventional manner at 40–100° C. (104–212° F.) to give a colored fiber containing about 0.01–2 percent by weight dye (100% color basis).

Alternatively, dyeing may be accomplished without a carrier at temperatures of 100–150° C. under pressure. Also, the dye may be applied in patterns by conventional printing methods, if desired.

The dye can also be applied to the aromatic polyester fiber by thermofixation methods, such as the "Thermosol" process. This process, which involves padding the cloth with the diluted dye dispersion followed by drying and heating the dried goods with hot air or heated contact rolls, is conveniently used for dyeing polyester fibers and blends containing these fibers. Temperatures of 180–220° C. (ea. 360–425° F.) are used for 30 to 90 seconds. If the fabric contains cotton or viscose rayon, apart from synthetic fibers, there is no danger of damaging cellulosic portions, but if wool is present, the temperature must be kept within 180–200° C. and the time must be reduced to 30 seconds.

In order to evaluate the effectiveness of a particular dye for a given type of fiber, the dyed fiber is examined for substantivity of the color, lightfastness of the color, and resistance of the color to sublimation.

Sample dyeings are tested for sublimation according to standard AATCC Color Fastness to Dry Heat (sublimation), Test No. 117–1967T, page B–74 of the 1967 Technical Manual of the American Association of Textile Chemist and Colorists. The dyed fabric is placed between a sandwich of undyed Dacron polyester fabric and heat is applied for 30 seconds. Sublimation tests are made at temperatures of 375° F., 400° F. and 425° F. Dyeings which are characterized by little or no transfer of color, particularly at temperatures of 400° F. and above are considered to be excellent in sublimation properties.

Dyeings are tested for light fastness by subjecting them to carbon arc fading in accordance with AATCC Color Fastness to Light: Carbon Arc Lamp, Continuous Light Test, Test No. 16A–1964. Dyeings which withstand at least 60 hours' exposure are considered to have superior fastness to light.

In addition to the coloration of polyester materials such as polyethylene terephthalate, other synthetic fibers may be dyed with the dyestuffs of the invention such as cellulose triacetate and superpolyamide fabrics.

The dyestuffs of the invention are also useful for the coloration of plastic by virtue of the fact that they are also pigments. Thus, according to a third aspect of the invention, the indigoid compounds (I), their mono- and dihalogenated derivatives, and mixtures thereof may be used for the coloration of rigid plastic substrates. The rigid plastic substrates contemplated within the scope of the invention are those plastic materials capable of being pigmented with the compounds of the invention, and will be referred to herein as "rigid plastic substrates." The rigid plastic substrates of the invention include those materials capable of being formed into a shaped article, including semi-rigid materials which may be deformed by application of pressure.

As rigid plastic substrates of the invention may be mentioned terpolymers, including acrylonitrile-styrene-butadiene, often known as ABS; acrylics, including methacrylics; polystyrene, both foamed and ruber modified polysulfones; cellulosic derivatives, particularly esters such as cellulose acetate, propionate and butyrate; polyamides such as nylon; epoxy and phenolic resins; polycarbonates; and polyesters. It is understood that the rigid plastic substrates include those materials capable of being pigmented with the compounds of the invention, and therefore copolymers of the above classes of compounds, such as styrene-butadiene, are also within the scope of the invention.

Specific examples of thermoplastic resins include polyvinyl chloride, polyvinyl acetate, vinyl chloride/acetate copolymers, polyvinyl alcohol, polyvinyl acetal, ethylene/vinyl acetate, ethylene/vinyl propionate, ethylene/vinyl isobutyrate, ethylene/vinyl alcohol, ethylene/methyl acrylate, ethylene/ethyl acrylate ethylene/ethyl methacrylate, ethylene/allyl alcohol, ethylene/allyl acetate, ethylene/acetone, ethylene/allyl benzene, ethylene/allyl ether, ethylene/acrolein, polyhexamethylene adipamide, polyhexamethylene sebacamide, polycaprolactam, polymethyl methacrylate, polyacrylonitrile, polymethyl acrylate, polyethyl methacrylate, and styrene/methyl methacrylate.

As preferred rigid plastics substrates of the invention may be mentioned the polyacrylates, polystyrene and polycarbonates.

The rigid plastic substrates are colored with the compounds of the invention through pigmentation processes. The compounds are admixed with the plastic using sets of mixing rollers, mixing or miling apparatus. After the compounds and the plastic have been thoroughly mixed, the resultant colored mixture is shaped into the desired final form through procedures well known to those skilled in the art, such as pouring, calendering, extrusion, spreading, or injection molding. Where the desired product is a semi-rigid material, plasticizers may advantageously be added prior to shaping into the desired final form. As plasticizers suitable for this purpose may be mentioned esters of phthalic acid. Although the plasticizer may be incorporated after the mixing of the compound of the invention with the rigid plastic substrate, it also can be incorporated into the rigid plastic material prior to mixing the pigment with the rigid plastic material. In order to vary the strength of the finished product or vary the color, it is also possible to add additional pigments or fillers in an amount sufficient to obtain the desired effect.

The amount of the compound of the invention which is used to color the rigid plastic substrate may vary widely depending upon the degree of color wished to be imparted to the final product, and depending upon whether the compound of the invention is the sole colorant or whether it is used in admixture with other plastic colorants. When the compound of the invention is used in admixture with other colorants, obviously a very minute quantity may be used to produce a complementary effect. Generally, the amount of colorant comprises less than 15%, preferably less than about 8%, by weight in relation to the rigid plastic substrate. An amount of colorant compound which has proved particularly valuable is about 0.0001% to about 1%.

The pigments may also be used for the coloration of printing inks, as well as for textile pigment printing.

The following nonlimiting examples serve to further illustrate the invention:

Example I

To a one liter pyrex fusion pot there was charged 500 g. of aluminum chloride (anhydrous). To it was added dropwise 125 g. of dimethylformamide with external cooling to keep the temperature from rising above 120° C. The melt was cooled to 55–60° C. A 70 g. quantity of benzenesulfonyl chloride was added to the melt, followed by the addition of 70 g. of ground indigotin powder (M. W. 262; 0.266 mole). An additional 50 g. of benzenesulfonyl chloride was then added dropwise; the mass was finally heated to 95–100° C. and was held at this temperature during one hour. It was then cooled to 70° C. and poured into 2000 g. of ice and water containing 85 g. of hydrochloric acid (20° Be′.). The slurry was heated with live steam to 95–100° C., diluted, and filtered and the cake thus obtained was washed acid free with hot water. The cake was then washed with a 1% soda ash solution. The resulting high molecular weight dyestuff (I) consisted of a halogenated mixture of a compound of the formula.

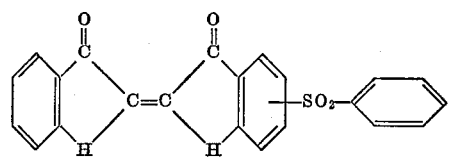

the compound containing an average of 1.0 chlorine atoms per molecule. A predominant species of the mixture was therefore a monochloro compound, with only minor amounts of unhalogenated compound. Yield: 529 g. cake, 24% dry test—126 g. 100% (theoretical yield for M.W. 436.5: 117 g.).

Analysis.—Calcd. ($C_{22}H_{13}N_2O_4SCl$): Cl, 8.15%; S, 7.3%. Found: Cl, 10.4%; S, 7.0%.

Example II

A 20% dispersed paste was prepared by milling the cake of Example I with 15% Marasperse N–22 (a commercially available lignin sulfonic acid dispersing material) based on the weight of the finished paste. The yield of paste was 630 g. Dyeings were made on polyethylene terephthalate by the established dyeing methods known as carrier dyeing, pressure dyeing, and thermofixation, respectively. Rich bright blue dyeings of excellent sublimation fastness were obtained. Other significant physical properties were also very good to excellent. The substantivity was surprising in view of the fact that indigotin, dispersed in the usual way and applied to polyester fabric in the conventional manner, leaves the goods virtually colorless.

Example III

Methymethacrylate resin is colored with the high molecular weight dyestuff of Example I as the colorant, in a ratio of 2 grams resin to 1 mg. colorant. The resin is prepared by placing 1 pound of methylmethacrylate into a Thropp mill (a 2-roller mill), which is then heated and run in order to melt and smash the resin to a molten mass. The high molecular weight dyestuff of Example I is added and the entire mixture of resin and colorant is milled until the colorant is uniformly distributed in the mass as measured by eye. While still hot, 30 grams of the hot mass is cut off for use in the following procedure. The sample, containing 30 grams methylmethacrylate and 15 mg. of the high molecular weight dyestuff of Example I as colorant, may be conveniently molded in a Laboratory 40 Single Acting Watson-Stillman Laboratory Press (Farrell-Birmingham Co. 50-ton press). 30 grams of methylmethacrylate mixture containing 15 mg. of the high molecular weight dyestuff of Example I per pound of methylmethacrylate is placed in the cold mold, which is then closed with the Schrader Valve. The drain is opened and steam is applied to the mold. When steam comes through the drain pipe, the drain is closed. Up to 25.0 tons pressure is exerted on the chips until the mold is fully closed. This can conveniently be accomplished by observing the pressure gauge. When the gauge needle no longer decreases in pressure, then the mold is closed.

The mold is held closed at zero pressure by releasing the hydraulic pressure and maintaining the steam for five minutes. The mold pressure is increased to 10 tons and held for ten minutes, the steam remaining on.

The mold pressure is increased to 15 tons and the steam shut off; the drain is opened and cooling water is added for five minutes. Thereafter the pressure is changed to zero and the mold is opened to extract the resultant plastic chip.

Example IV

When the 30 gram mixture of methylmethacrylate and the high molecular weight dyestuff of Example I are replaced by 2 pounds polystyrene, 10.44 grams titanium dioxide and 227 mg. of the high molecular weight dyestuff of Example I, following the procedure of Example II a fast coloration of the polystyrene is obtained.

Example V

The high molecular weight dyestuff of Example I may also be used as a colorant to impart a blue shade to plastics made from polycarbonates. A pigmented plastic material of polycarbonates and the high molecular weight dyestuff of Example I may be prepared according to the following procedure:

A specimen is prepared by dry mixing pelletized or powdered resin with finely divided colorant until uniform distribution is achieved of the colorant in the resin material. Plasticizer may also be added, if desired. The mixture is then extruded or injected molded under suitable conditions, 454 gms. Lexan 121-R (General Electric) pellets are placed in Bipel one ounce reciprocating screw injection molder. The pellets are tumbled for five minutes on the barrel tumbler. The resin is heated (front zone temperature of 550° F. and rear zone temperature of 500° F.) and chips are produced from the virgin resin until chips of good quality are obtained. When the desired quality of chips are obtained with the clear resin, a fresh batch of Lexan 121-R, containing the high molecular weight dyestuff of Example I in an equivalent amount corresponding to Example II to produce a pigmented plastic material is fed into the injection molder, to produce blue pigmented chips having excellent fastness characteristics.

Example VI

To a one liter Pyrex fusion pot there was charged 500 g. of aluminum chloride (anhydrous). To it was added dropwise 125 g. of dimethylformamide with external cooling to keep the temperature from rising above 120° C. The melt was cooled to 55–60° C. A 70 g. quantity of benzenesulfonyl chloride was added to the melt, followed by the addition of 75 g. of ground thioindigo powder (M.W. 296; 0.25 mole). An additional 50 g. of benzenesulfonyl chloride was then added dropwise. The mass was heated slowly to 125° C. and was held at this temperature during one hour. It was then cooled to 90° C. and poured into 3000 g. of ice and water. The drowned mass was heated to 60° C. and stirred one hour at this temperature. The acid slurry obtained was filtered and the cake was washed acid free with hot water.

The high molecular weight dyestuff which is produced is a halogenated derivative of a compound of the formula

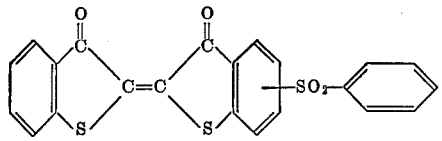

which contains an average of 2.0 chlorine atoms per molecule. Yield: 250 g. cake, 42% dry test—110 g. 100% (theoretical yield 120 g.).

Calc. for $C_{22}H_{10}Cl_2O_4S_3$: Cl, 14.0%; S, 19.0%. Found: Cl, 13.0%; S, 18.0%.

Example VII

A 20% dispersed paste is prepared by milling the moist cake of Example VI in water with 15% Marasperse N-22 based on the weight of the finished paste. Dyeings on polyester are brilliant pink. Sublimation and substantivity are somewhat better than the corresponding properties of the starting material.

Example VIII

By substituting an equivalent amount of the high molecular weight dyestuff of Example VI for the high molecular weight dyestuff of Example I in the procedure of Example III, pink coloration of methylmethacrylate is obtained.

Example IX

Substitution of an equivalent amount of the high molecular weight dyestuff of Example VI for the high molecular weight dyestuff of Example I in the procedure of Example IV yields polystyrene colored in a pink shade.

Example X

In order to obtain a pink coloration of polycarbonate, an equivalent amount of the high molecular weight dyestuff of Example VI is substituted for the high molecular weight dyestuff of Example I, otherwise following the procedure of Example V.

Example XI

In a manner similar to that described in Example I, 69.7 g. 2(6-chloro-4-methyl-3-oxo-2(3H)thianaphthylidene)pseudoindoxyl (M.W. 279; 0.25 mole) is treated with benzoyl chloride and aluminum chloride. There is obtained 114 g. of a compound of the formula

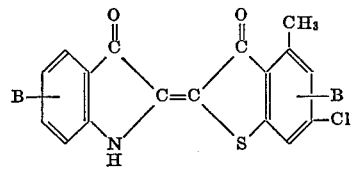

wherein one B is phenylsulfonyl and the other B is hydrogen, and which high molecular weight dyestuff contains an average of 1.0 additional chlorine atoms added through the reaction.

Example XII

Substitution of the high molecular weight dyestuff of Example XI in the procedure of Example II for the high molecular weight dyestuff of Example I yields excellent dyeings on polyethylene terephthalate. The dyeings, which are purple, have a particularly rich shade when applied to the fiber via the thermofix method. The fastness to sublimation is particularly good.

Example XIII

Substitution of the high molecular weight dyestuff produced in Example XI in an equivalent amount for the high molecular weight dyestuff of Example I yields, when the procedure of Example IV is otherwise followed, coloration of polystyrene in a purple hue.

Example XIV

Methylmethacrylate is pigmented with the high molecular weight dyestuff of Example XI by substituting an equivalent amount of the high molecular weight dyestuff of Example XI for the high molecular weight dyestuff of Example I, otherwise following the procedure of Example III.

Example XV

Polycarbonate may be pigmented in a purple color by replacing the high molecular weight dyestuff of Example I with an equivalent amount of the high molecular weight dyestuff of Example XI, otherwise following the procedure of Example V.

Example XVI

In a manner similar to that of Example III, 79 g. of 6,6′-dichloro-4,4′-dimethylthioindigo (M.W. 395; 0.2 mole) are treated with benzenesulfonyl chloride and aluminum chloride. The product obtained weighs 119 g. Approximately one benzenesulfonyl group enters the thioindigoid nucleus, and comparatively little additional halogen.

The high molecular weight dyestuff thus consists of a compound of the formula

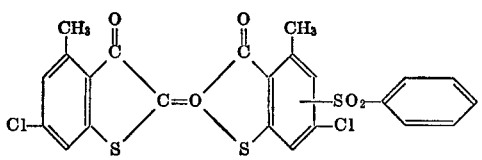

and a minor amount of monochlorinated derivative thereof.

Example XVII

Substitution of the high molecular weight dyestuff of Example XVI in the procedure of Example II yields excellent dyeings on polyethylene terephthalate. The dyeings, which are bluish red, have a rich shade when applied to the fiber via the thermofix method. The fastness to sublimation is outstanding.

Example XVIII

Substitution of the high molecular weight dyestuff produced in Example XVI in an equivalent amount for the high molecular weight dyestuff of Example I yields, when the procedure of Example IV is otherwise followed, coloration of polystyrene having a bluish red hue.

Example XIX

Methylmethacrylate is pigmented with the high molecular weight dyestuff of Example XVI by substituting an equivalent amount of the product of Example XI for the high molecular weight dyestuff of Example I, otherwise following the procedure of Example III.

Example XX

Polycarbonate may be pigmented in a bluish red color by replacing the high molecular weight dyestuff of Example I with an equivalent amount of the high molecular weight dyestuff of Example XVI, otherwise following the procedure of Example V.

Example XXI

Substitution of 57 g. p-toluenesulfonyl chloride for the benzoyl chloride of Example I, otherwise following the procedure of Example I, yields 120 g. of the corresponding p-methyl-substituted high molecular weight dyestuff.

Example XXII

Substitution of an equivalent amount of the high molecular weight dyestuff of Example XXI for that of Example I in the procedure of Example II yields excellent dyeings on polyethylene terephthalate. The dyeings, which have a bright bluish shade, are obtained by application to the fiber via the thermofix method.

Example XXIII

Substitution of the high molecular weight dyestuff produced in Example XXI in an equivalent amount for the high molecular weight dyestuff of Example I yields, when the procedure of Example IV is otherwise followed, coloration of polystyrene having a blue hue.

Example XXIV

Methylmethacrylate is pigmented a blue shade with the high molecular weight dyestuff of Example XXI by substituting an equivalent amount of the high molecular weight dyestuff of Example XXI for the high molecular weight dyestuff of Example I, otherwise following the procedure of Example III.

Example XXV

Polycarbonate may be pigmented in a blue color by replacing the high molecular weight dyestuff of Example I with an equivalent amount of the high molecular weight dyestuff of Example XXI, otherwise following the procedure of Example V.

Example XXVI

In the manner of Example I, 68.2 g. 5-bromoindigotin is treated with aluminum chloride and benzenesulfonyl chloride. The weight of product (94.0 g.) and halogen and sulfur analysis indicates that essentially one benzenesulfonyl group and very little additional halogen enters the indigoid nucleus. Thus, the high molecular weight dyestuff consists essentially of the following compound and a minor amount of a monochloro derivative thereof:

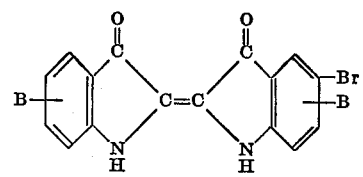

wherein one B is phenylsulfonyl and the other B is hydrogen.

Example XXVII

The high molecular weight dyestuff of Example XXVI is suitably dispersed and, when dyed in the usual manner, yields dyeings of blue hues, somewhat greener in shade than the dyed polyethylene terephthalate of Example II. Via thermofixation, especially good results are achieved. Good properties of the dyeing are achieved, in particular, excellent sublimation fastness is attained.

Example XXVIII

Substitution of the dyestuff produced in Example XXVI in an equivalent amount for the dyestuff of Example I yields, when the procedure of Example IV is otherwise followed, coloration of polystryrene having a bluish shade.

Example XXIX

Methylmethacrylate is pigmented with the compound of Example XXVI by substituting an equivalent amount of the product of Example XI for the dyestuff of Example I, otherwise following the procedure of Example III.

Example XXX

Polycarbonate may be pigmented in a bluish color by replacing the dyestuff of Example I with an equivalent amount of the product of Example XXVI, otherwise following the procedure of Example V.

What is claimed is:
1. A compound of the formula

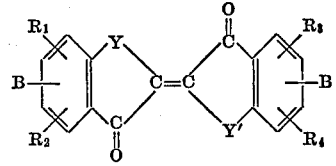

wherein each of Y and Y' is independently —NH— or —S—; each of $R_1$, $R_2$, $R_3$ and $R_4$ is independently hydrogen, chloro, bromo, lower alkyl, or lower alkoxy; one B is hydrogen and the other B is an arylsulfonyl group of the formula

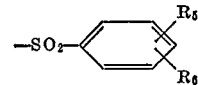

wherein each of $R_5$ and $R_6$ is independently hydrogen, chlorine, bromine, lower alkyl, lower alkoxy or nitro.

2. A halogenated mixture of a compound of the formula

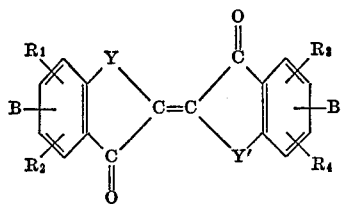

wherein each of Y and Y' is independently —NH— or —S—; each of $R_1$, $R_2$, $R_3$ and $R_4$ is independently hydrogen, chloro, bromo, lower alkyl, or lower alkoxy; one B is hydrogen and the other B is an arylsulfonyl group of the formula

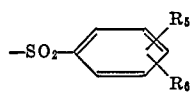

wherein each of $R_5$ and $R_6$ is independently hydrogen, chlorine, bromine, lower alkyl, lower alkoxy or nitro, said halogenated mixture consisting essentially of said compound and the monohalo and dihalo derivatives thereof, said halo being chloro or bromo and attached to aromatic carbon atoms of said compound.

3. A monochloro derivative of a compound of the formula

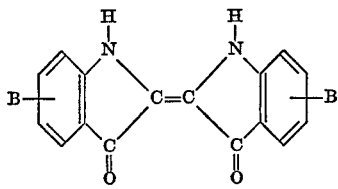

wherein one B is hydrogen and the other B is phenylsulfonyl, the chlorine being attached to an aromatic carbon atom of said compound.

4. A dichloro derivative of a compound of the formula

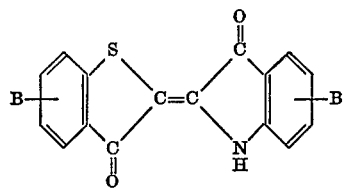

wherein one B is hydrogen and the other B is phenylsulfonyl, the chlorine being attached to aromatic carbon atoms of said compound.

5. A mixture of claim 2, wherein the average degree of halogenation is from about 0.1 to about 2.0 halogen atoms per molecule.

6. A compound of the formula

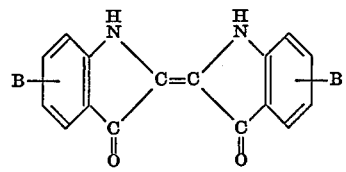

wherein one B is hydrogen and the other B is phenylsulfonyl.

7. A compound of the formula

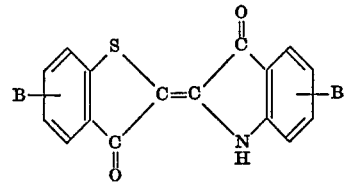

wherein one B is hydrogen and the other B is phenylsulfonyl.

References Cited
UNITED STATES PATENTS
2,812,329  11/1957  Reusser et al. _____ 260—290

JOSEPH A. NARCAVAGE, Primary Examiner

U.S. Cl. X.R.

8—55; 260—37, 40, 41, 321, 322, 331, 332.